*Thompson & Hobbs,*
*Door Knob.*
Nº 2,628.     Patented May 20, 1842.
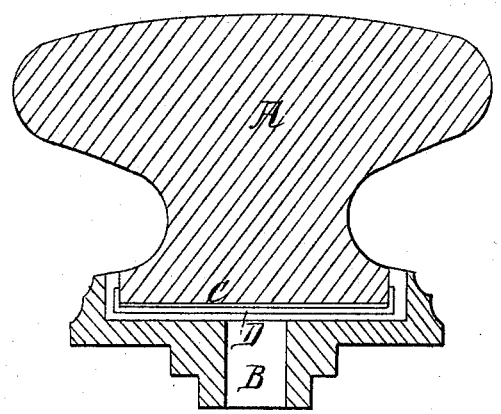
Witnesses:
R. H. Eddy.
J. Noble
Inventors
William S. Thompson
Alfred G. Hobbs

UNITED STATES PATENT OFFICE.

WM. S. THOMPSON, OF CAMBRIDGE, AND ALFRED C. HOBBS, OF BOSTON, MASSACHUSETTS.

MANNER OF MAKING GLASS KNOBS.

Specification of Letters Patent No. 2,628, dated May 20, 1842.

*To all whom it may concern:*

Be it known that we, WILLIAM S. THOMPSON, of Cambridge, in the county of Middlesex, and ALFRED C. HOBBS, of Boston, in the county of Suffolk, in the State of Massachusetts, have invented new and useful Improvements in the Manufacture of Glass Knobs and other Articles of Similar Character to which Said Improvements are Applicable, of which invention the following forms a full and exact specification, wherein we have also set forth such parts or combinations as we claim and for which we solicit Letters Patent.

The method, heretofore in general use of connecting the glass handle to the socket of a knob, was by melted metal poured between the same; and in order to give the article, when finished, the requisite appearance, a piece or disk of tin, silver or gold foil was previously interposed between the bottom of the metallic socket and that of the glass handle. The glass has sometimes been cemented into the socket, but in so doing a difficulty has occurred which has heretofore prevented such a mode of connection from being successfully adopted; that difficulty consisting in the cement becoming insinuated or forced, to a greater or less extent, between the foil and the glass, when the handle was pressed into the socket, or by the contraction of the socket as the cement became cooled, or from heat or other causes; thus spoiling the appearance or finish of the article. The covering the exterior of the foil, silver or gold leaf (when these latter have been used instead of the former) by a coating of common paint, which has been suffered to dry thereon at the ordinary temperature of the atmosphere, has not remedied the difficulty, as the great heat, requisite to liquefy the cement, blisters or destroys the paint to such an extent as generally to produce the evil above mentioned. And for some time it has been the desire of manufacturers to discover a composition, which being applied to the bottom of the glass handle, would so resist the effects of the heat and pressure, as to prevent the destruction of, or any injurious consequences to, the foil, silver or gold leaf, or other article used. It should be understood that it is customary to insert glass plates for doors into their frames or sockets, without heating them during the operation. To protect the leaf or foil used on the backs of such plates, it is only necessary to paint or varnish it over, as the cement which confines the glass to its socket, being used at the ordinary temperature of the atmosphere, does not injure the foil or leaf. But in glass knobs or handles which are to be subjected to forces, having a great tendency to destroy the tenacity of the cement and thereby loosen the knob in its socket, and thus render it unfit for its intended purpose, a different kind of cement to that employed for door plates becomes necessary; the said cement being that used by philosophical instrument makers, or being composed of plaster of Paris or gum shellac, rosin and emery, combined together by heat; and when it is applied to the articles, it is requisite to heat them to a high temperature (oftentimes such as would melt soft solder) in order to liquefy the cement and cause it to strongly adhere by the contraction of the metallic socket as the latter cools.

The process discovered and adopted by us for protecting the foil or silver or gold-leaf is as follows. The lower face of the glass handle or that part of it inserted in the metallic socket, is to be ground and polished in the usual manner. It is then to be suitably covered over with the foil or gold or silver leaf, (the gold or silver leaf we consider preferable to the foil, as it gives a better appearance to the articles when finished) which should also extend a short distance up the sides of the glass, or of that part of the same inserted in the metallic socket; and should be burnished, or rubbed smooth upon its seat, by a pellet of cotton or other suitable substance. The part, so gilt or silvered or prepared as above set forth, is to be subjected to the process known in the arts by the term "japanning," that is to say, it is to be covered with the preparation or composition which is usually applied by japanners to lamps, waiters, &c., and which is to be dried or fixed thereon by slowly heating the glass to a high degree of temperature in an oven, in the same manner as the japanning process is carried on. When the composition is thus baked upon the foot of the glass it becomes capable in most every case of successfully resisting any injurious action of the hot cement used in the process of connecting the socket to it.

By the above method of protecting the foot of the glass handle we are enabled to use cement in order to cause the parts to adhere, thus rendering a smaller and neater trimming or socket sufficient for a knob than when the parts are connected by melted metal. Besides, as the cement adheres perfectly to the glass and socket, and so completely fills or hermetically seals the space between them, all moisture, gas or saline atmosphere, having a tendency to tarnish the silver leaf or foil, is excluded; the action of which cannot be prevented when the glass handle is secured to its socket by melted metal, as the continual twisting of the knob, by the hand applied to it, soon loosens the handle in the socket sufficiently to occasion the above injurious effects.

In protecting the foot of the glass handle as set forth, we apply those compositions thereto, well known to and ordinarily used by japanners in their business, which do not blister or crack off by heat, and which require to be baked or fixed upon the articles by heat substantially in the same manner as we have herein before described. We do not deem it necessary to specifiy their exact component parts as they do not materially differ from each other either in their composition or application, but are generally understood by the term "japanning" as applied to lamps trays and such like articles to be subjected to heat.

We sometimes adopt another method of protecting the foil or leaf which consists in pasting or cementing a piece of thin oiled cloth, muslin or other suitable fabric, over the lower face of the same, and which should extend a short distance up the sides of the foot of the knob and be glued or otherwise properly cemented thereto. The outer surface of the cloth should be covered with a coating of japanning or varnish or other suitable material; but although this latter process may be often successfully adopted we do not consider it of so much utility as that first described.

Having thus explained our invention we shall claim—

1. Protecting the gold or silver leaf or foil, which covers that part of the glass inserted in the metallic socket, from injury, during the above described operation of cementing the parts together, by the japanning compositions previously applied thereto and indurated by heat, substantially in the manner and on the principles above set forth.

2. Also protecting the foil or leaf by means of a covering of muslin oiled cloth or other suitable fabric laid and cemented over the same and having its outer surface covered with a coating of varnish, japanning or other suitable material as described.

In testimony that the foregoing is a true description of our said invention and discovery we have hereto set our signatures this fifth day of May in the year eighteen hundred and forty-two.

WILLIAM S. THOMPSON.
ALFRED C. HOBBS.

Witnesses:
R. H. Eddy,
Ezra Lincoln, Jr.